May 16, 1933.  C. F. GERLINGER  1,909,579
LUMBER CARRIER
Filed July 3, 1929  5 Sheets-Sheet 1

Inventor
Carl F. Gerlinger
T. J. Geisler
Attorney

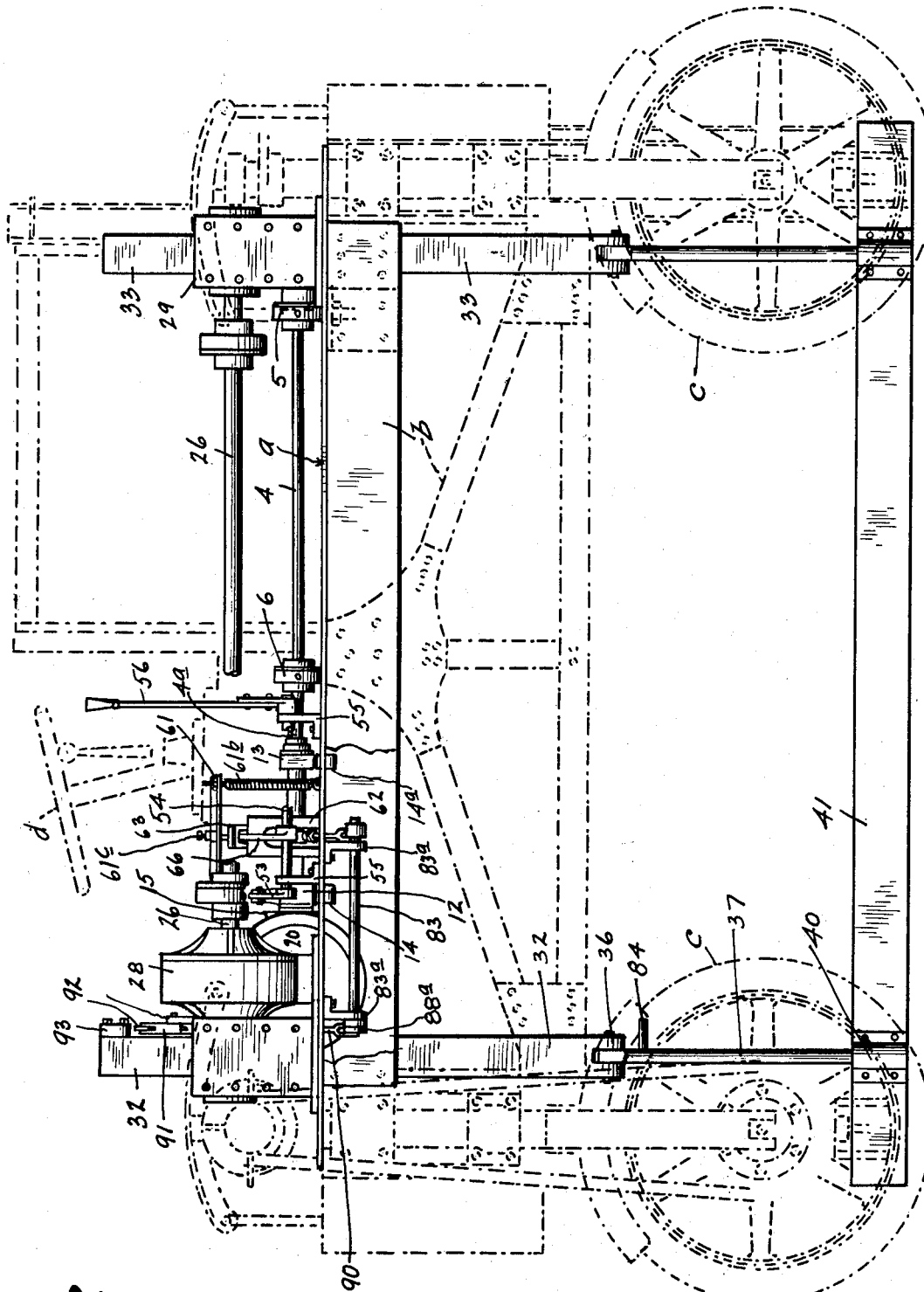

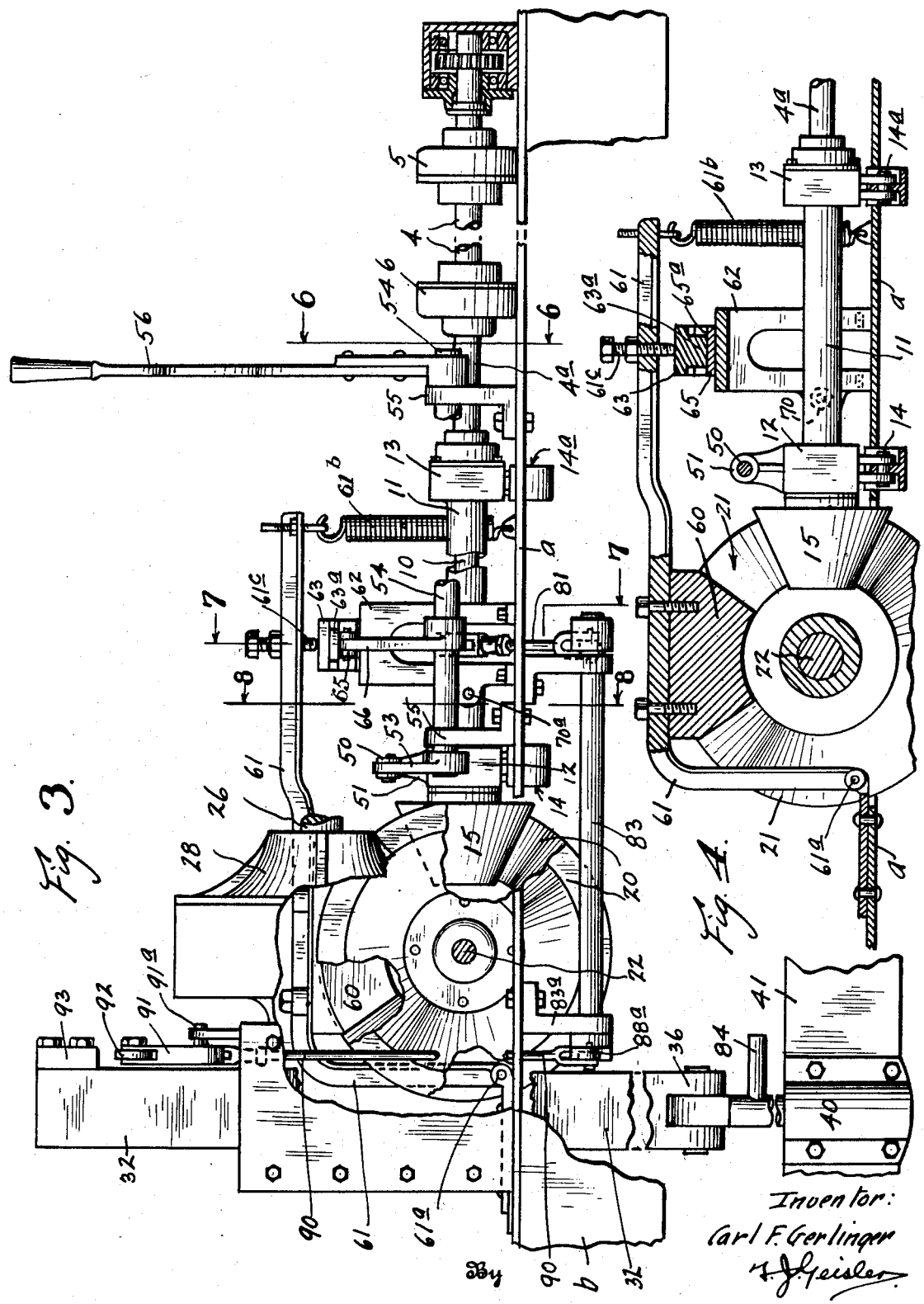

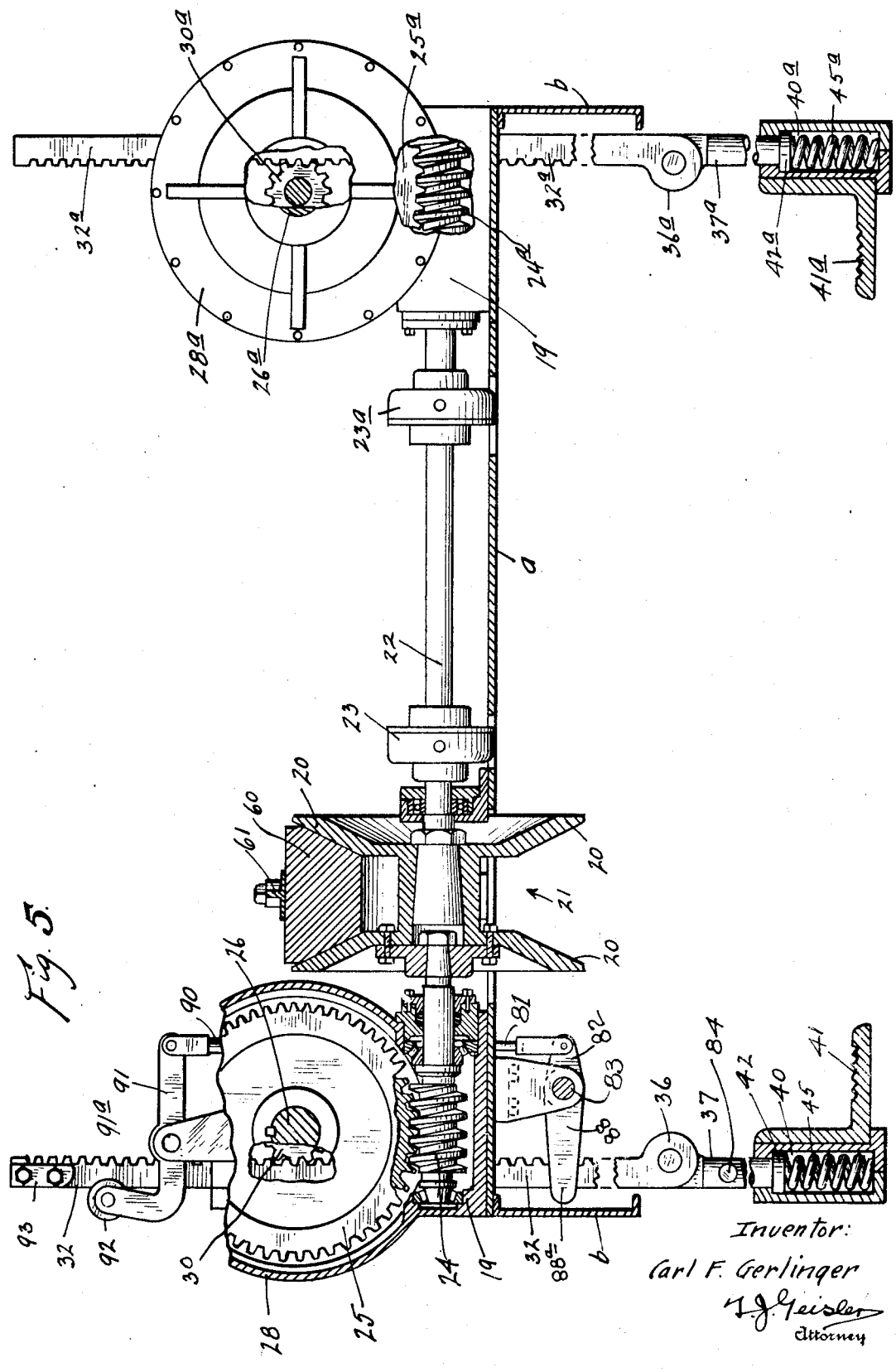

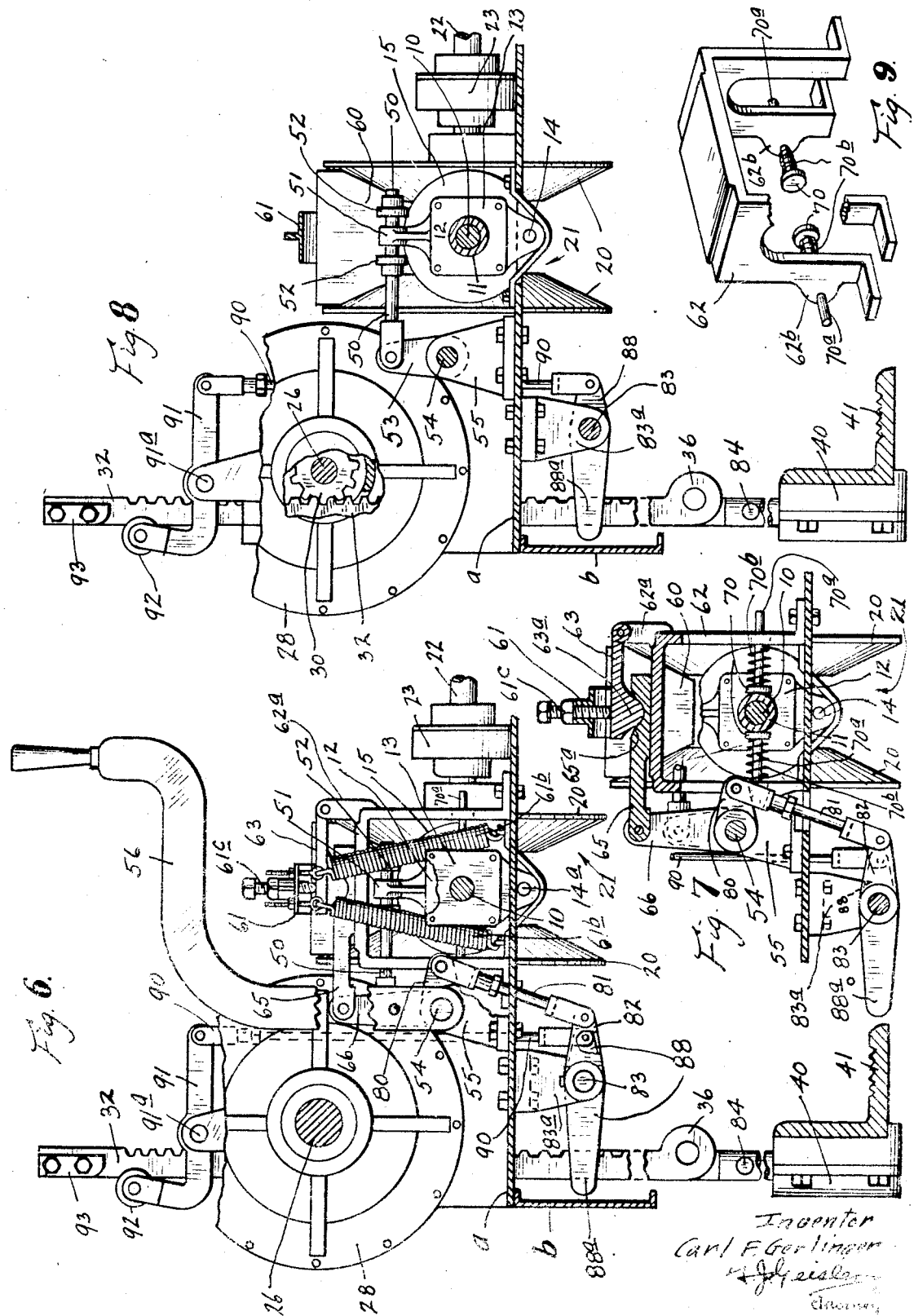

Patented May 16, 1933

1,909,579

UNITED STATES PATENT OFFICE

CARL F. GERLINGER, OF DALLAS, OREGON

LUMBER CARRIER

Application filed July 3, 1929. Serial No. 375,832.

My invention relates to motor driven, straddling, hoisting trucks which are adapted for use in hoisting and transporting piles of lumber about a lumber mill and are commonly known as "lumber carriers" and are hereinafter referred to as such.

These lumber carriers in order to operate as economically and efficiently as possible must be capable of continuous and dependable service and have a high degree of flexibility of operation, that is to say, the lumber carrier must operate practically without breakdowns and repairs, and must be capable of moving rapidly in either direction, stopping, hoisting or unloading a pile of lumber of a varying size and getting quickly into motion again and at the same time holding the load so that it cannot upset during the said rapid movement of the carrier.

The lumber carriers in present use have more or less failed in these respects, in that they lack the said flexibility of operation and are incapable of holding a pile of lumber of a varying size securely so as to prevent the spilling or upsetting of the load.

A further disadvantage of the present lumber carrier is that they are complicated in construction and operation and require frequent repairs and replacements which are expensive and during which the carrier is out of service.

The object of my invention is to provide a relatively simple and dependable lumber carrier adapted to move rapidly in either direction, to start and stop quickly and to pick up or discharge its load substantially simultaneously as it stops, whereby the efficiency and daily capacity of the lumber carrier is increased with the resulting savings in operating costs.

A further object of my invention is to provide a lumber carrier adapted to pick up and hold a pile of lumber of any size within the maximum capacity of the carrier and transport and unload the same without upsetting or spilling any part of it.

A still further object of my invention is to provide a lumber carrier capable of continuous and efficient service, with only infrequent repairs and replacements and which is economical of operation and of such strong construction as to be able to withstand the severe and continuous duty imposed upon it by the nature of the work and the more or less unskilled and careless driving of the ordinary operator.

These objects and other incidental features of my lumber carrier, the details of construction and mode of operation are hereinafter fully described with reference to the accompanying drawings.

In the drawings:

Fig. 2 shows similarly, a side view of my lumber carrier;

Fig. 3 shows in a fragmentary side elevation the raising and lowering means and the load-carrying elements removed from the lumber carrier;

Fig. 4 shows a view partly in section, taken on the line 4—4 of Fig. 1, and illustrates the brake mechanism detached from the other parts;

Fig. 5 shows a section taken on the line 5—5 of Fig. 1;

Fig. 6 shows a section taken on the line 6—6 of Fig. 3;

Fig. 7 shows a section taken on the line 7—7 of Fig. 3;

Fig. 8 shows a section taken on the line 8—8 of Fig. 3; and

Fig. 9 shows a perspective detached view of part of the brake mechanism and transmission operating means.

Figure 1:
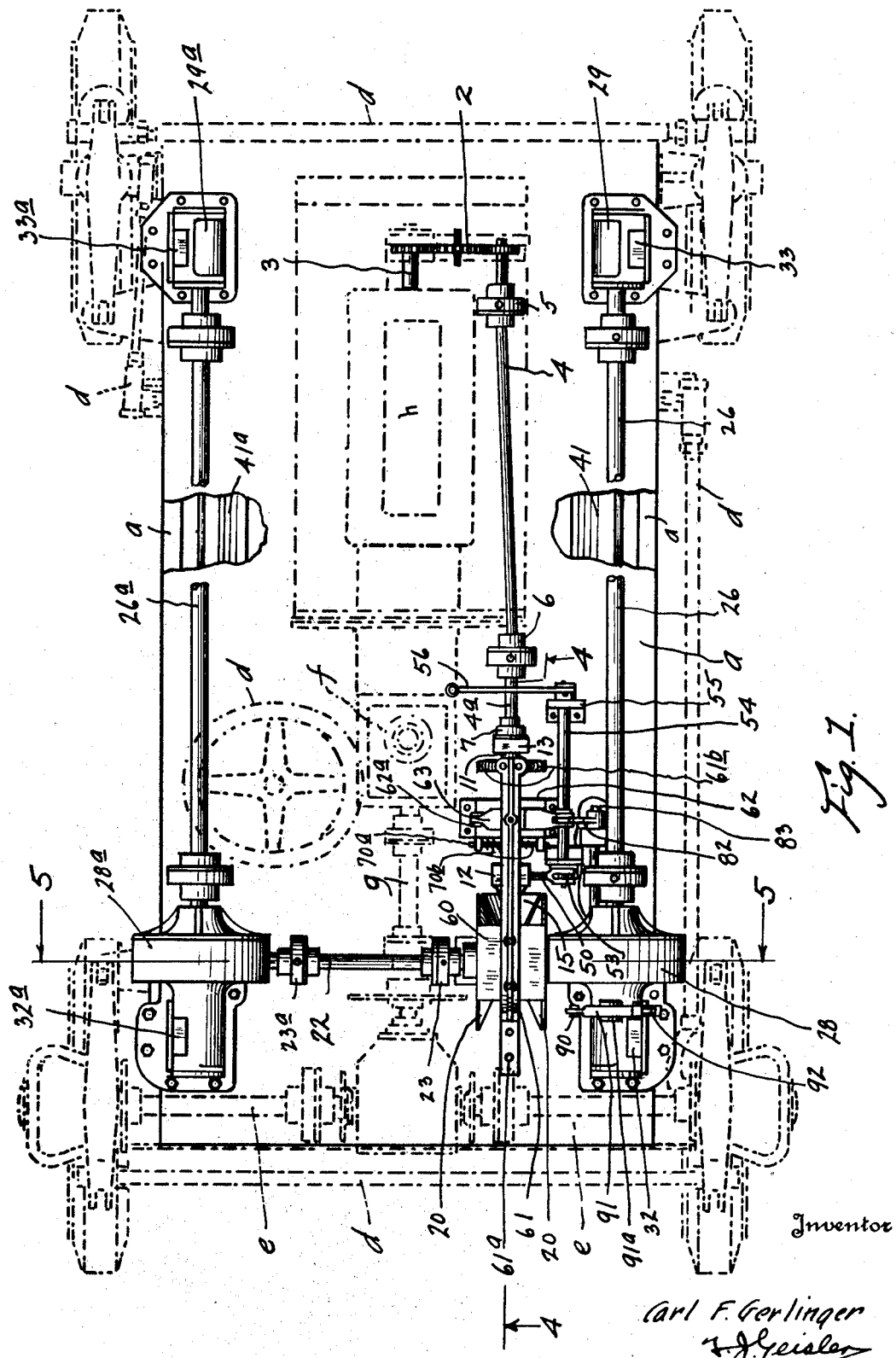
Fig. 1 shows a top plan view of my lumber carrier, the parts constituting my invention being shown in full lines and the remainder in broken lines.

Referring now to the figures and particularly to Figs. 1 and 2, my lumber carrier comprises a platform $a$ and parallel spaced side supporting frames or members $b$ forming between them a load carrying space. The frames $b$ are supported at each end on driven ground wheels $c$ journaled therein. Suitable steering connections $d$ and driving connections $e$ are provided, the latter through suitable transmission gearings $f$ from the rearward end of the drive shaft $g$ of a motor $h$. The foregoing parts comprise the usual structure of the well known lumber carrier and are shown in broken lines only and will not be further described.

A suitable power take off transmission 2 is connected to the forward end 3 of the motor drive shaft $g$. A supplemental drive shaft 4 arranged parallel to the motor drive shaft $g$ is connected at its forward end by means of a flexible coupling 5 to the said power take off transmission and is connected at its rearward end through a flexible coupling 6 with a reversible friction transmission comprising a short shaft section 4a which in turn is connected at its other end through a flexible coupling 7 to a shaft section 10 which is journaled in a housing 11 provided with boxes 12 and 13 at its ends pivotally connected as at 14, 14a to the platform $a$ for lateral movement, see Figs. 4 and 8.

The rearward end of the shaft section 10 is provided with a friction cone 15 arranged between the inner sides of a friction transmission wheel 20 formed of two frusto-cones connected together at their smaller ends, thus forming a more or less V-shaped annular groove 21 between them.

The friction wheel 20 is fast on a transverse shaft 22 journaled at each end in the gear housings 19 and provided with flexible couplings 23, 23a. Worm gears 24, 24a provided on the extremities of the transverse shaft 22 mesh with spiral tooth gears 25, 25a fast on shafts 26, 26a, arranged parallel to the primary shaft 4 and extending the length of the lumber carrier on each side thereof and journaled at their respective ends in the housings 28, 28a and 29, 29a.

The shafts 26, 26a are provided on each of their ends with pinion gears 30, 30a meshing with vertically arranged racks 32, 32a and 33, 33a comprising the load raising and lowering means hereinafter further described.

The racks 32, 32a and 33, 33a extend through and are guided in the platform $a$, and their lower ends are secured as at 36, 36a to lifting legs 37, 37a. The lower ends of the legs 37, 37a are loosely secured in sockets 40, 40a in each end of horizontally and oppositely arranged load-carrying shoes 41, 41a, see Fig. 5, by means of shoulders 42, 42a carried by the said legs. Stiff expansion springs 45, 45a are provided in said sockets between the ends of the legs and the bottom of the sockets, whereby shocks caused by the striking of the shoes 41, 41a on obstructions on the ground as the load-carrying shoes are lowered, will be absorbed and not transmitted to the load raising and lowering means above.

The means for operating the said friction transmission comprising the shaft section 10, the friction cone 15 and the friction wheel 20, consist of a link 50 slidably mounted in a guide 51 on the box 12 and provided at each side of the said guide with a shoulder 52. The link 50 is connected to a crank arm 53 fast on a short shaft 54 journaled on the platform $a$ parallel with the shaft section 10, in supports 55. A manually operated lever 56 is fast on the said shaft 54, the upper end of which is located adjacent the driver's seat of the lumber carrier.

By this construction when the lever 56 is in the neutral position, the friction cone 15 is not in contact with either side of the friction wheel 20, therefore the load raising and lowering means are stationary, but when the lever 56 is moved, say to the right, the friction cone 15 is brought into contact with the right side of the V-shaped groove 21 of the friction wheel 20 and the rotation of the shaft 10 will be transmitted in a reverse direction to the transverse shaft 22 and the rack 32, 32a and 33, 33a will be actuated to raise the said load carrying shoes 41, 41a.

A movement to the left from the neutral position of the lever 56 will bring the friction cone 15 into contact with the other side of the friction wheel 20 and the rotation of the said shaft 10 will be transmitted to the shaft 22 in the opposite direction and hence the racks will be actuated to lower the said load carrying shoes.

In combination with the said friction transmission I have provided a braking and locking means comprising a brake shoe 60, V-shaped in cross section and suspended in the V-shaped groove 21 of the friction wheel 20 from an upwardly curved arm 61, pivotally mounted as at 61a on the platform $a$. The arm 61 extends forwardly a substantial distance and is attached at its free end to the platform $a$ by contracting springs 61b which normally hold the shoe 60 in contact with the friction wheel 20.

An inverted U-shaped frame 62, see Fig. 9, is secured to the platform $a$ over and transversely of the housing 11 and under the said arm 61. An arm 63 is pivoted in a boss support 62a on one side of the frame 62 and its other end is provided with a downwardly projecting lug 63a bearing in a recess 65a in a slide 65, which rests on the frame 62 and is connected at its other end to a crank arm 66 mounted fast on the said short shaft 54.

An adjusting screw 61c is provided in the arm 61 which bears on the said lever 63 so that when the lever 56 is in its neutral position the brake shoe 60 is held closely against the inner faces of the friction wheel 20 and the said transmission is held against movement by the springs 61b.

However, when the lever 56 is moved either to the right or left to actuate the transmission, the slide 65 is moved correspondingly and lifts the lever 63 as the projection 63a rides out of the recess 65a, thus raising the arm 61 and lifting the brake shoe 60 from the friction wheel 20 and thus releasing the brake before the cone 15 is brought into contact with the friction wheel 20.

Stops 70 are provided on the inner ends of opposed rods 70a slidably carried in bosses 62b on the sides of the frame 62. Springs 70b are arranged on said rods between the stops 70 and the frame, thus serving as supplemental means for returning the shaft 10 and therewith the friction cone 15 to neutral position when the lever 56 is released.

Automatic upper and lower limit stops are provided for the load raising and lowering means, comprising a crank arm 80 carried on the said short shaft 54, to which is connected a link 81 extending through the platform a and connected at its other end to a lever 82 fast on a shaft 83 carried on the underside of the platform a in brackets 83a. A lever 88 fast at its middle point on the said shaft 83, is arranged so that one end is adjacent to the rack 32 on the lower end of which is a pin 84 thus as the load-carrying shoes reach their upper limit of movement the pin 84 will strike the free end 88a of the lever 88 and actuate the crank arm 53 to move the cone 15 to its neutral position.

A rod 90 is connected to the other end of the lever 88 and extends upwardly through the platform a and is connected to a lever 91 pivoted at 91a. The other end of the lever 91 carries a roller 92 adapted to bear against a block 93 carried at the upper end of the rack 32 when the latter reaches its lowermost position so that when the load-carrying shoes have reached their lower limit of movement, the lever 91 will actuate the shaft 83 to stop the load raising and lowering means as before described.

In the operation of my lumber carrier, the shaft 4 is driven continuously by the motor whether the load raising and lowering means are in operation or not. The operator of the carrier, when a pile of lumber is to be transported about the mill yard, drives the carrier astride the said pile, the load carrying shoes being in their lowermost position, and stops. He then actuates the load raising and lowering means by moving the lever 56 in the proper direction to bring the cone 15 into contact with the side of the friction wheel 20 which will transmit the driving motion of the shaft 5 to the transverse shaft 22 to raise the load carrying shoes and lift the load of lumber.

The load-carrying shoes are then moved upward until the load of lumber is clamped between the said shoes and the underside of the platform a, thus holding it securely and preventing the pieces of lumber from falling sideways on one another while the carrier is in motion, so that when the load is deposited it will not fall over, requiring manual labor to pile it up again.

When the said shoes have been raised as far as the load of lumber will permit, the operator moves the lever 56 to the neutral position in the meantime having actuated the driving mechanism, to start the load moving towards its destination.

By providing a friction transmission for the control of the load raising and lowering means, a certain amount of slippage of the transmission elements is permitted, thus allowing the lumber to be tightly clamped against the underside of the platform a, as before mentioned. Further, the operator does not have to throw the transmission into neutral just the instant the load is clamped, thus eliminating considerable strain on the lifting mechanism which would be the case if a gear transmission were used.

Furthermore, by providing this type of transmission a separate clutching and transmission mechanism and their operating levers are eliminated, thus contributing towards the simplicity and economy of construction of the carrier.

Then when the load of lumber is transported to the desired place, the operator stops the carrier and simultaneously moves the lever 56 in the opposite direction which actuates the transmission to drive the load-carrying shoes downward, thus speeding up the unloading operation, until the shoes are in such position as to deposit the lumber on the ground when the block 93 on the rack 30 strikes the lever 91 which actuates the lever 66 to stop the downward movement of the shoes without further attention.

When the carrier is being driven about the yard empty, it is desirable to raise the load-carrying shoes so as not to strike an obstruction, so the operator moves the lever 56 to the lifting position and the shoes move upwardly until the pin 84 on the leg 37 strikes the end 88a of the lever 88 and actuates the lever 66 to stop the said upward movement.

Thus by this construction, I have provided a lumber carrier capable of withstanding the severe duty imposed on it and of operating rapidly with no lost motion or time during which the load of lumber is being picked up or deposited. Also I have provided a carrier so simple in operation as to be easily driven and operated by any of the help about the mill, with but little practice.

I claim:

1. In a driven mechanism, a driven shaft having a flexible section, a complementary shaft, a reversible friction transmission, the elements whereof are carried by said flexible section of said driven shaft and said complementary shaft, respectively, a brake element for said transmission, an operating lever connected to one element of the transmission and said brake, a spring element normally applying the brake element and simultaneously placing the transmission in neutral, whereby the movement of the operating lever simultaneously releases the brake and throws the transmission into action, and a supplemental normal spring control for the said flexible shaft section.

2. In a driven mechanism, a driven shaft, a complementary shaft, a reversible friction transmission, the elements whereof are carried by said driven shaft and said complementary shaft, respectively, a brake element for said transmission, an operating lever connected to one element of the transmission and said brake, a spring element normally applying the brake element and simultaneously placing the transmission in neutral, a device operated from the complementary shaft, a stop carried by said device at a terminal of movement, and means engaged by said stop adapted to return the operating lever to neutral when the latter means are engaged by said stop.

3. In a driven mechanism, a driven shaft having a flexible section, a friction cone carried by said flexible section, a transverse shaft, a friction wheel carried by said transverse shaft and engageable by said friction cone for being driven by the latter in opposite directions, a spring controlled pivoted frame, a brake shoe carried by such frame and adapted to be engaged with said friction wheel, a slide, the free end of the said frame being supported on said slide, and lifted by the movement of the latter to lift the brake, and an operating lever connected to the flexible shaft section and to said slide, the spring control of the said pivoted frame normally holding the friction cone in neutral position and the brake shoe applied.

4. In a driven mechanism, a driven shaft having a flexible section, a friction cone carried by said flexible section, a transverse shaft, a friction wheel comprising spaced cone elements carried by said transverse shaft and engageable by said friction cone, a spring controlled pivoted frame, a brake shoe carried by such frame and located between and adapted to be engaged with said cone elements of the friction wheel, a slide, the free end of the said frame being supported on said slide, and lifted by the movement of the latter to lift the brake, and an operating lever connected to the flexible shaft section and to said slide, the spring control of the said pivoted frame normally holding the friction cone in neutral position and the brake shoe applied.

5. In a driven mechanism, a driven shaft having a flexible section, a friction cone carried by said flexible section, a transverse shaft, a friction wheel carried by said transverse shaft and engageable by said friction cone for being driven by the latter in opposite directions, a spring controlled pivoted frame, a brake shoe carried by such frame and adapted to be engaged with said friction wheel, a slide, the free end of the said frame being adjustably supported on said slide, and lifted by the movement of the latter to lift the brake, and an operating lever connected to the flexible shaft section and to said slide; the spring control of the said pivoted frame normally holding the friction cone in neutral position and the brake shoe applied.

6. In a driven mechanism, a driven shaft having a flexible section, a friction cone carried by said flexible section, a transverse shaft, a friction wheel carried by said transverse shaft and engageable by said friction cone for being driven by the latter in opposite directions, a spring controlled pivoted frame, a brake shoe carried by such frame and adapted to be engaged with said friction wheel, a horizontal support located over the friction wheel, a slide on said horizontal support, the free end of the said frame being supported on said slide, and lifted by the movement of the latter to lift the brake, and an operating lever connected to the flexible shaft section and to said slide, the spring control of the said pivoted frame normally holding the friction cone in neutral position and the brake shoe applied.

7. In a driven mechanism, a driven shaft having a flexible section, a friction cone carried by said flexible sections, a transverse shaft, a friction wheel carried by said transverse shaft and engageable by said friction cone for being driven by the latter in opposite directions, a spring controlled pivoted frame, a brake shoe carried by such frame and adapted to be engaged with said friction wheel, a horizontal support located over the friction wheel, a slide on said horizontal support, the free end of the said frame being adjustably supported on said slide, and lifted by the movement of the latter to lift the brake, and an operating lever connected to the flexible shaft section and to said slide, the spring control of the said pivoted frame normally holding the friction cone in neutral position and the brake shoe applied.

8. In a driven mechanism, a driven shaft having a flexible section, a friction cone carried by said flexible section, a transverse shaft, a friction wheel carried by said transverse shaft and engageable by said friction cone for being driven by the latter in opposite directions, a spring controlled pivoted frame, a brake shoe carried by such frame and adapted to be engaged with said friction wheel, a slide, the free end of the said frame being supported on said slide, and lifted by the movement of the latter to lift the brake, and an operating lever connected to the flexible shaft section and to said slide, the spring control of the said pivoted frame normally holding the friction cone in neutral position and the brake shoe applied; and a supplemental spring element for returning said flexible shaft section normally to neutral position.

9. In a driven mechanism, a driven shaft having a flexible section, a friction cone carried by said flexible section, a transverse shaft, a friction wheel carried by said transverse shaft and engageable by said friction cone for being driven by the latter in opposite directions, a spring controlled pivoted frame, a brake shoe carried by such frame and adapted to be engaged with said friction wheel, means for lifting and lowering said frame, and an operating lever connected to the flexible shaft section and to said means, the spring control of the said pivoted frame normally holding the friction cone in neutral position and the brake shoe applied.

CARL F. GERLINGER.